No. 878,834.
PATENTED FEB. 11, 1908.
W. A. STAMM.
PISTON VALVE.
APPLICATION FILED MAY 8, 1907.
3 SHEETS—SHEET 1.
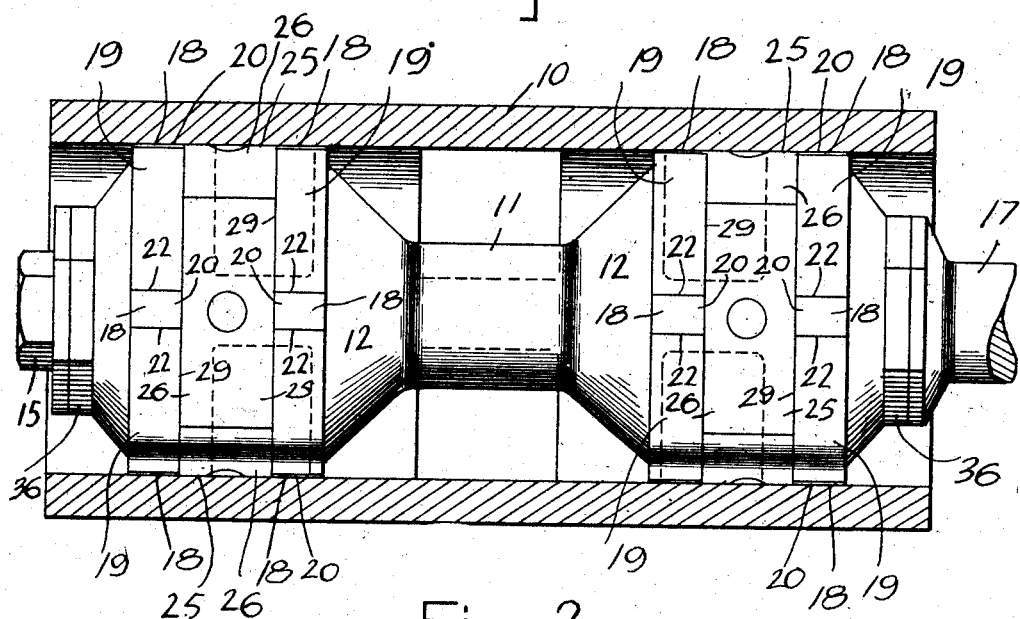
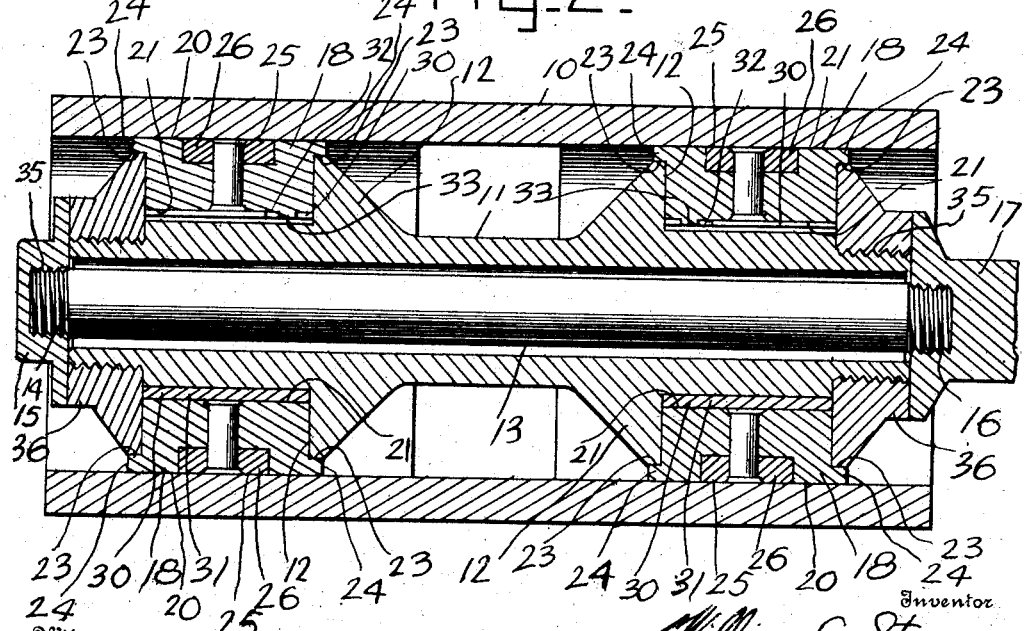

No. 878,834. PATENTED FEB. 11, 1908.
W. A. STAMM.
PISTON VALVE.
APPLICATION FILED MAY 8, 1907.

3 SHEETS—SHEET 2.

Witnesses
W. S. Rockwell
F. G. Smith

Inventor
William A. Stamm
By Chandler & Chandler
Attorneys

No. 878,834. PATENTED FEB. 11, 1908.
W. A. STAMM.
PISTON VALVE.
APPLICATION FILED MAY 8, 1907.

3 SHEETS—SHEET 3.

Witnesses
W. J. Rockwell
F. G. Smith

Inventor
William A. Stamm
By Chandler & Chandler
Attorneys

UNITED STATES PATENT OFFICE.

WILLIAM A. STAMM, OF MACON, OHIO.

PISTON-VALVE.

No. 878,834.　　　Specification of Letters Patent.　　　Patented Feb. 11, 1908.

Application filed May 8, 1907. Serial No. 372,546.

*To all whom it may concern:*

Be it known that I, WILLIAM A. STAMM, a citizen of the United States, residing at Macon, in the county of Brown, State of Ohio, have invented certain new and useful Improvements in Piston-Valves; and I do hereby declare the following to be a full, clear, and exact description of the invention, such as will enable others skilled in the art to which it appertains to make and use the same.

This invention relates to piston valves and more particularly to that class in which the packing is in the form of a number of packing segments which are to be expanded or fed to accommodate for wear by the action of a split resilient ring and the primary object of the invention is to improve the general construction of such devices and to provide a more satisfactory valve and one which will be absolutely steam tight.

Broadly stated each of the packings is composed of a plurality of interlocked packing segments but, while all of these segments perform a packing function, alternate ones of the segments are so formed that action of the split resilient ring thereupon will cause them to expand the remaining packing segments which are associated therewith.

Figure 3:
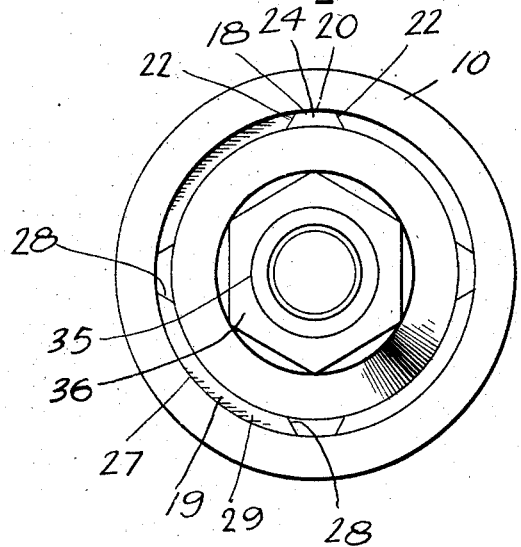
Figure 4:
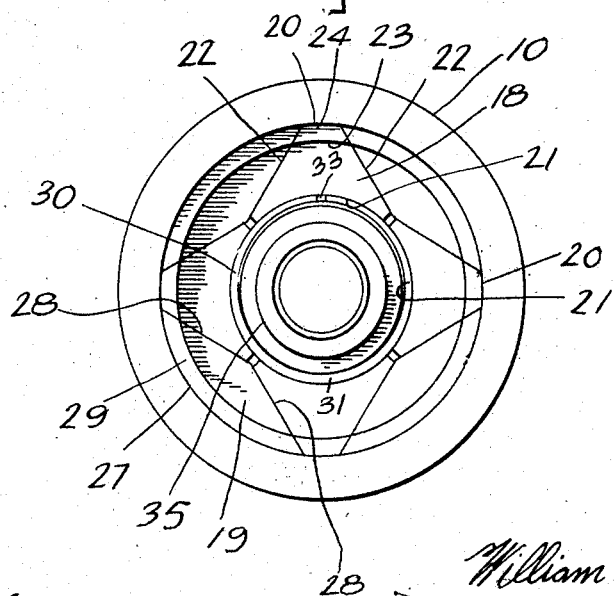
Figure 5:
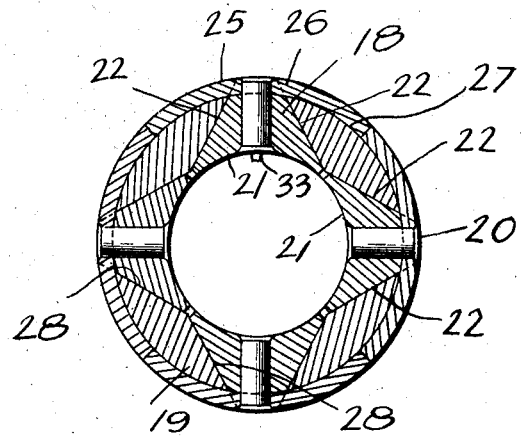
Figure 6:
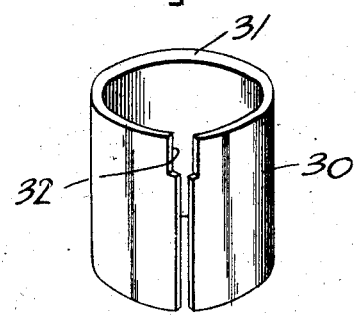
Figure 8:
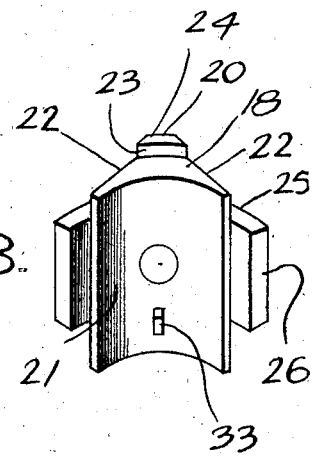
Figure 9:
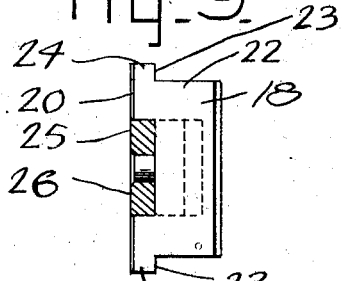
Figure 7:
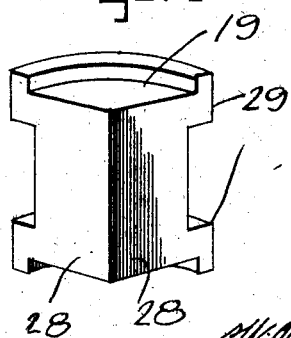

In the accompanying drawings, Figure 1 is a longitudinal sectional view through the bushing for the valve and showing the valve in elevation therein, Fig. 2 is a longitudinal sectional view through the bushing and the valve, Fig. 3 is an end elevation of the valve, Fig. 4 is a similar view but with one of the cap nuts removed, Fig. 5 is a vertical transverse sectional view taken through one of the packings for the valve, Fig. 6 is a detail perspective view of one of the split resilient rings, Fig. 7 is a similar view of one of the packing segments, Fig. 8 is a similar view of one of the wedge or expanding packing segments, and, Fig. 9 is a detail side elevation, partly in section of one of the expanding packing elements.

In the drawings there is illustrated a bushing 10 which is of the usual construction and therefore need not be specifically described and in which the piston valve embodying my invention is designed to work.

The valve comprises a core 11 provided upon opposite sides of its middle with annular shoulders 12. The core is hollow and engaged therethrough is a stem 13 which at its forward end is threaded as at 14 and has engaged upon the said end a nut 15. This nut bears against the forward end of the core and the opposite end of the stem 13 is threaded as at 16 and screwed into the forward end of the valve rod 17 which rod bears at its extreme forward end against the rear end of the core. The core is in this manner connected with the valve rod for reciprocatory movement therewith.

The packings for the valve are identical in construction and hence a description of one will suffice for both.

The packing is composed of a plurality of packing segments, certain of which are indicated in general by the numeral 18 and the others by the numeral 19. Each of the segments 18 has a substantially wedge-shaped body, the upper and under faces of the body being respectively convexed and concaved as indicated by the numerals 20 and 21 and the side faces 22 of the segment being converged in the direction of the upper face 20 for the purpose of forming the wedge above mentioned. The end faces of segments are undercut as indicated by the numeral 23 so as to form a shoulder 24 at each end of the member the function of which shoulder will be presently made apparent. The wear surface of the segment in question is comprised of the upper face of the body of the segment and of the convexed face 25 of an arcuate plate 26 which is riveted at its middle to the body of the segment and in a recess cut in the upper face of the said body, it being understood of course that the upper face of the body and the upper or convexed face of the wear plate are flush. The wear plate is substantially concentric with respect to the upper and under faces of the body of the packing segment.

Each of the packing segments 19 comprises a body having a convex upper face 27 and a two-sided under face 28 the said sides being extended at an obtuse angle with respect to each other. Formed upon the upper face 27 of the body of each segment 19 and at the ends thereof are ribs 29 which conform to the curvature of the said upper face 27 of the body.

In assembling the packing segments, the projecting portions of the plates 26 are received between the ribs 29 of the segments 19 and as clearly shown in the end elevation of the drawings, the ends of these ribs abut the convergent side faces of the body of the packing segments 18 in a plane with the shoulders formed at the ends of the said packing segments 18. The under faces 28 of the packing segments 19 rest against the convergent side faces of the segments 18 the purpose of this feature will be presently specifically set forth.

In order to expand the packings I have provided a split resilient ring which is indicated by the numeral 30 and is thickened at its middle as indicated at 31 so that the pressure exerted upon it by all of the segments will be equal. As stated this ring is split and the end edges of the ring are notched at one end as indicated at 32 for the reception of a stud 33 formed integral with and projecting inwardly from the concaved under face of one of the packing segments 18, it being understood that the packing segments are built up around this spring ring then slipped over that portion of the core 11 which lies substantially intermediate its ends and the adjacent shoulders 12. Any pressure exerted by the split ring against the concaved under faces of the bodies of the packing segments 18 will tend to cause these segments to separate or expand and by reason of the fact that they are substantially wedge-shaped and that they are in contact with the under faces of the segments 19, the said segments 19 will also be expanded.

Each end of the core 11 is reduced and threaded as indicated at 35 for the engagement thereon of a cap nut 36 which nut bears against the adjacent end of the corresponding packing. The ends of the packing segments 19 are undercut so as to form projecting shoulders which are as a matter of fact extensions of the ribs upon the said segments and these shoulders are coincident with the shoulders formed upon the segments 18. In other words at each end of the packing when completed, there is formed an annular shoulder and within the boundaries of these shoulders are received the cap nuts and the shoulders upon the core of the valve. This reception of the cap nuts and the shoulders of the core prevents wear or frictional contact of the nuts and shoulders with the bushing.

What is claimed is—

1. A piston valve comprising a core, annular shoulders formed upon the core at opposite sides of the middle thereof, a split resilient ring embracing the core at each end thereof and outwardly of the shoulders, and packings embracing the rings, said packings being built up of packing segments which are disposed alternately with respect to each other, certain of said packing segments being wedge-shaped and having wear extensions which are concentric with the outer or convex faces of the segments, the other of said segments being provided on their convex faces with ribs between which the wear extensions of the first mentioned segments are received, the last mentioned segments having two-sided under faces which contact with the wear faces of the first mentioned segments, whereby the last mentioned segments will be expanded due to the action of the split resilient ring upon the first mentioned segments, the end of said ring at one side thereof being notched, and a lug formed upon one of the packing segments and seated in said notches.

2. A packing ring made up of two sets of packing segments, the segments of the two sets being disposed alternately, the segments of one set being wedge-shaped and having wear extensions which are concentric with the outer convex faces thereof, the segments of the other set being provided upon their convex faces with ribs between which the wear extensions of the first mentioned segments are received, the last mentioned segments having two-sided under faces which contact with the wedge-shaped faces of the first mentioned segments.

3. A piston valve comprising a core, annular shoulders formed upon the core at opposite sides of the middle thereof, a split resilient ring embracing the core at each end thereof and outwardly of the shoulders, and packings embracing the rings, said packings being built up of packing segments which are disposed alternately with respect to each other, certain of said packing segments being wedge-shaped and having wear extensions which are concentric with the outer or convex faces of the segments, the other of said segments being provided upon their convex faces with ribs between which the wear extensions of the first mentioned segments are received, the last mentioned segments having two-sided under faces which contact with the wedge faces of the first mentioned segments whereby the last mentioned segments will be expanded due to the action of the split resilient ring upon the first mentioned segments.

In testimony whereof, I affix my signature, in presence of two witnesses.

WILLIAM A. STAMM.

Witnesses:
SAM LAYTON,
HARRY STAMM.